(12) United States Patent
Guo et al.

(10) Patent No.: US 8,203,332 B2
(45) Date of Patent: Jun. 19, 2012

(54) GEAR TOOTH SENSOR (GTS) WITH MAGNETORESISTIVE BRIDGE

(75) Inventors: Yimin Guo, San Jose, CA (US); Grace Gorman, San Jose, CA (US)

(73) Assignee: MagIC Technologies, Inc., Milpitas, CA (US)

( * ) Notice: Subject to any disclaimer, the term of this patent is extended or adjusted under 35 U.S.C. 154(b) by 427 days.

(21) Appl. No.: 12/214,925

(22) Filed: Jun. 24, 2008

(65) Prior Publication Data

US 2009/0315543 A1    Dec. 24, 2009

(51) Int. Cl.
*G01B 7/30* (2006.01)
(52) U.S. Cl. .............................. 324/207.25; 324/207.21
(58) Field of Classification Search .................... None
See application file for complete search history.

(56) References Cited

U.S. PATENT DOCUMENTS

| | | | |
|---|---|---|---|
| 5,351,028 A | 9/1994 | Krahn | |
| 5,540,108 A * | 7/1996 | Cook et al. | 73/862.041 |
| 5,585,719 A | 12/1996 | Endo et al. | |
| 6,020,736 A | 2/2000 | Aoyama et al. | |
| 6,127,821 A | 10/2000 | Ramsden et al. | |
| 6,690,155 B2 * | 2/2004 | Vig et al. | 324/207.12 |
| 6,815,944 B2 * | 11/2004 | Vig et al. | 324/179 |
| 7,112,957 B2 | 9/2006 | Bicking | |
| 7,138,793 B1 | 11/2006 | Bailey | |
| 7,195,211 B2 | 3/2007 | Kande et al. | |
| 7,592,803 B1 * | 9/2009 | Guo et al. | 324/207.25 |
| 7,619,407 B2 * | 11/2009 | Guo et al. | 324/207.25 |
| 2003/0178989 A1 * | 9/2003 | Vig et al. | 324/207.2 |
| 2003/0201044 A1 * | 10/2003 | Schick | 73/146 |
| 2006/0261801 A1 | 11/2006 | Busch | |
| 2006/0268469 A1 | 11/2006 | Sato et al. | |
| 2008/0036617 A1 | 2/2008 | Arms et al. | |
| 2009/0256552 A1 * | 10/2009 | Guo et al. | 324/207.21 |

FOREIGN PATENT DOCUMENTS

WO    PCT/US 09/03735    10/2009

OTHER PUBLICATIONS

Co-pending US Patent HMG07-061, U.S. Appl. No. 12/082,257, filed Apr. 10, 2008, "Gear Tooth Sensor with Single Magnetoresistive Bridge," assigned to the same assignee as the present invention.
Infineon application note "Dynamic Differential Hall Effect Sensor IC TLE 4923," Jul. 1, 2007, pp. 1-18.
Exchange anisotropy and micromagnetic properties of PtMn/NiFe bilayers, by Taras Pokhil et al., Journal of Applied Physics, vol. 89, No. 11, Jun. 1, 2001, pp. 6588-6590.
"GT Sensors Precision Gear Tooth and Encoder Sensors," NVE Corporation, pp. 46-55, published on internet on Dec. 12, 2006, found: www.nve.com.

* cited by examiner

*Primary Examiner* — Jermele M Hollington
(74) *Attorney, Agent, or Firm* — Saile Ackerman LLC; Stephen B. Ackerman (57) ABSTRACT

The invention discloses a method and apparatus for determining the rotational status of a gear wheel whether or not it is actually turning. A key feature is the magnetic angle sensor that is used. Said sensor comprises a bridge structure of four MR devices in a square array. The direction of the pinned reference layer is the same for all four devices and lies along one of the diagonals of said square array. A single wafer process is used to manufacture the invented device.

29 Claims, 6 Drawing Sheets

GEAR TOOTH SENSOR (GTS) WITH MAGNETORESISTIVE BRIDGE

This application is related to application No. 12/082,257, now U. S. Pat. No. 7,619,407 and herein incorporated, by reference, in its entirety.

FIELD OF THE INVENTION

The invention relates to the use of magnetic field angle sensors for determining the rotational status of a gear wheel.

BACKGROUND OF THE INVENTION

Figure 1:
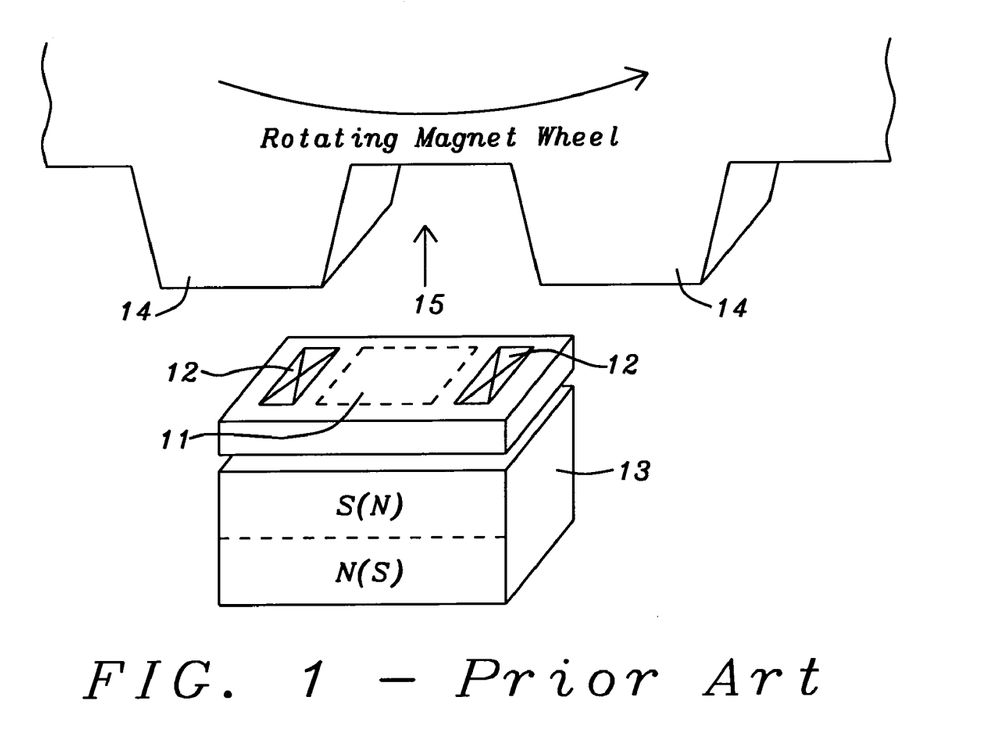
FIG. 1. Prior art device using a Hall effect IC based gear tooth sensor.
Figure 2A:
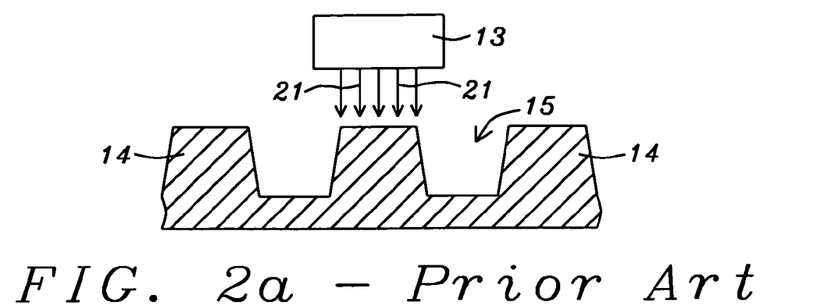
FIGS. 2a-d. Prior art device showing the sequence as a gear moves past a GMR based gear tooth sensor.
Figure 2B:
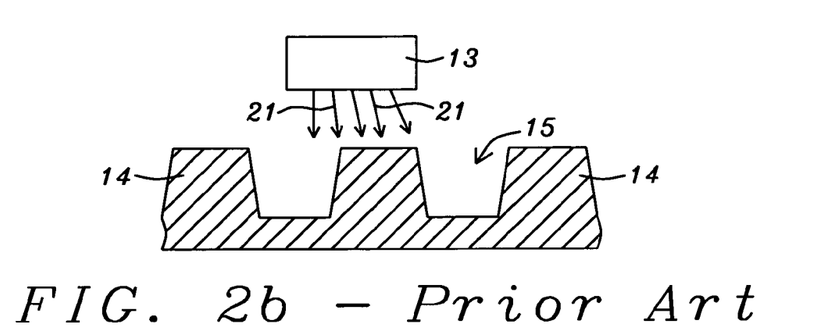
Figure 2C:
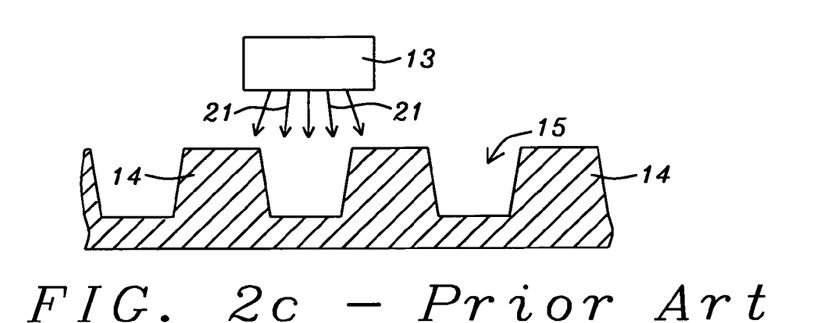
Figure 2D:
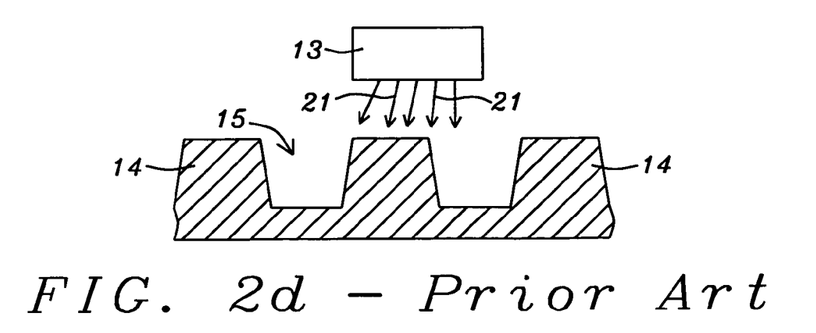

As shown in FIG. 1, a conventional gear tooth sensor [1] consists of an IC (integrated circuit) 11 that includes Hall effect sensors 12 together with a single hard magnet 13. The IC supports two Hall sensors, which sense the magnetic profile of the ferrous target simultaneously, but at different points, thereby generating a differential internal analog voltage that is further processed for precise switching of the digital output signal. To achieve a high differential signal output, the two Hall probes (or sensors) are spaced at a certain distance so that one Hall sensor faces field concentrating tooth 14 and the other Hall sensor faces gap 15 in the toothed wheel. A permanent magnet mounted with one pole on the rear side of the IC produces a constant magnetic bias field.

If one Hall sensor momentarily faces a tooth while the other faces a gap between teeth, the gear tooth acts as a flux concentrator. It increases the flux density through the Hall probe and a differential signal is produced. As the gear wheel turns, the differential signal changes its polarity at the same rate of change as from the tooth to the gap. An integrated highpass filter regulates the differential signal to zero by means of a time constant that can be set with an external capacitor. In this way only those differences that changed at a minimum rate are evaluated. The output signal is not defined when in the steady state.

A GMR based gear tooth sensor has also been described in which the sensing structure is similar to traditional Hall IC based gear tooth sensor except that the two Hall probes are replaced by two GMR sensors [2]. As shown in FIGS. 2a-d, the magnetic field generated by the bias magnet is influenced by the moving gear tooth, the GMR sensors serving to detect the variation of the magnetic field component within the GMR film plane. The signal output is then generated from differential signals from two GMR sensors or a GMR bridge. Since the permanent magnet is mounted with either pole on the rear side of the GMR sensors (as in the Hall IC based gear tooth sensor) the magnetic field is essentially perpendicular to the GMR films.

If two or more permanent magnets are used to generate the bias field, it becomes possible to locate the GMR sensors within an area in which the magnetic field is zero when the sensor is opposite a gap between teeth, rising to its maximum value when opposite a tooth.

References
1. Infineon application note "Dynamic Differential Hall Effect Sensor IC TLE 4923"
2. NVE application note "Precision Gear Tooth and Encoder Sensors"

A routine search of the prior art was performed with the following references of interest being found:

In U.S. Patent Application 2006/0261801, Busch teaches four AMR elements arranged in a Wheatstone bridge to form a gear tooth sensor. U.S. Pat. No. 7,112,957 (Bicking) discloses MR sensors in a Wheatstone bridge to sense gear teeth in various positions. A permanent magnet is also disclosed.

U.S. Pat. No. 5,351,028 (Krahn) shows a gear tooth sensor using a permanent magnet and MR elements in a Wheatstone bridge. In U.S. Pat. No. 7,195,211, Kande et al. teach that a gear tooth sensor can comprise a Hall effect sensor or a magneto-restive sensor while, in U.S. Pat. No. 7,138,793, (Bailey shows that a gear tooth sensor can be a Hall effect sensor or a GMR sensor.

SUMMARY OF THE INVENTION

It has been an object of at least one embodiment of the present invention to provide a method for determining the rotational status of a gear wheel, whether or not said wheel is rotating.

Another object of at least one embodiment of the present invention has been to provide a detector based on said method.

Still another object of at least one embodiment of the present invention has been to describe a process whereby said detector may be manufactured on a single chip or wafer without needing to add separately manufactured sub-assemblies or parts.

These objects have been achieved by displacing the rotation sensor so that it overhangs only part of the wheel's rim, extending a distance away from the wheel's edge. The field sensor uses a bridge structure made up of four MR devices that form a square array. The direction of the pinned reference layer is the same for all four devices and lies along one of the diagonals of said square.

The device senses the field associated with each tooth of the wheel (said field going to zero in the gap between teeth). So, the signal that the sensor outputs can be used to determine the precise rotational status of the wheel, enabling, for example, two gear wheels to be precisely aligned at the time that they are brought together.

BRIEF DESCRIPTION OF THE DRAWINGS

FIG. 5. Compares the in-plane magnetic field as a function of the offset distance of the MR sensor from the gear wheel edge for when a tooth goes by and when a gap goes by.

DESCRIPTION OF THE PREFERRED EMBODIMENTS

Figure 3:
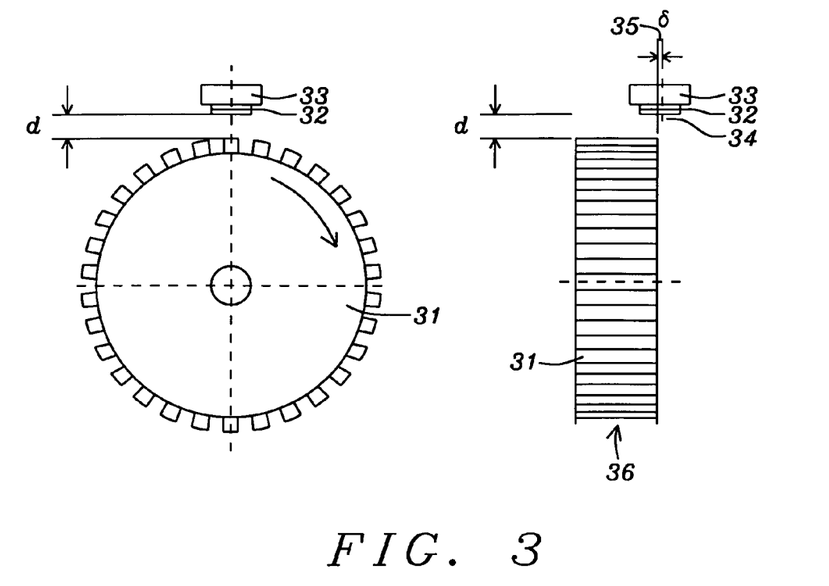
FIG. 3. Shows the basic apparatus of the invention.

Throughout the discussion that now follows, we will use the terms 'toothed wheel' and 'gear wheel' interchangeably. FIG. 3 shows two views of gear wheel 31 (full face at left and edge-on at right). As can be seen, sensor 32, along with its associated permanent magnet 33 (or multiple magnets) has been located a distance d from rim 36 of wheel 31. Also seen in FIG. 3 is a key feature of the invention namely the positioning of sensor 32 so that its centerline 34 is displaced away from edge 35 of the gear wheel by an amount δ.

Acceptable values for d are in the range of from 0.1 to 10 mm, with from 1 to 6 mm being preferred, while acceptable values for δ are in the range of from 0 to 5 mm, with from 1 to 3 mm being preferred.

Figure 4A:
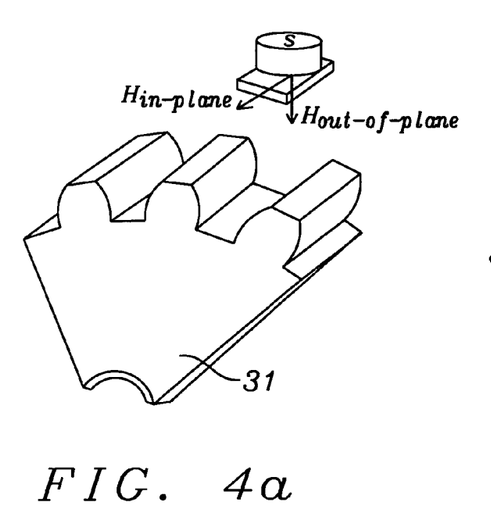
FIGS. 4a-4b. These illustrate the spatial relationship between the sensor and the rotational state of the toothed wheel.
Figure 4B:
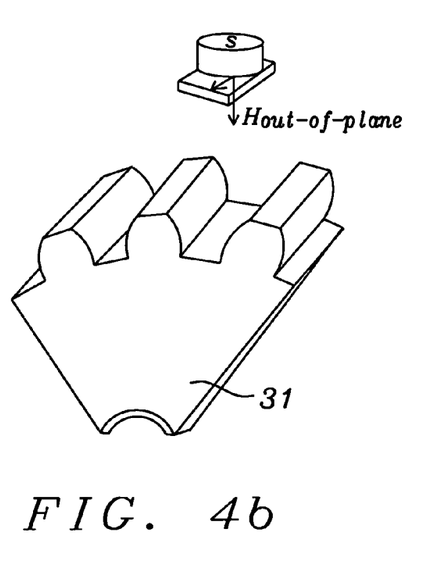

The consequences of the geometrical arrangement shown in FIG. 3 are schematically illustrated in FIG. 4. Since the sensor is no longer directly above the wheel the vertical field that it senses when a tooth moves directly opposite to it is less than would be the case if the sensor were directly above the wheel (as in prior art arrangements). On the other hand, it can now sense the horizontal field that is associated with each tooth. In particular, said horizontal field lies in the plane of the MR sensor's free layer, the plane in which it has the greatest influence of the free layer. This is the case that is illustrated in FIG. 4a.

Figure 5:
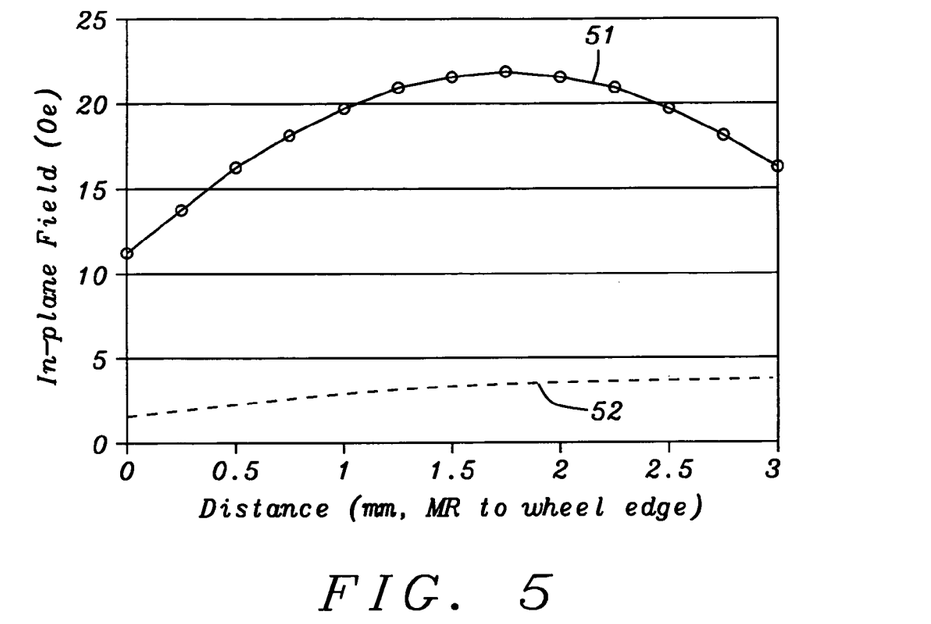

The tooth's horizontal field moves away from the sensor very rapidly as the gap between teeth arrives opposite the sensor. This is the case illustrated in FIG. 4b where it can be seen that, while the vertical (i.e. out-of-plane) field, corresponding to the device's anisotropy direction, remains essentially unchanged, the horizontal (i.e. in-plane) field, along the devices easy axis, has changed significantly. As a result, when the sensor is used to measure gear wheel speed, it experiences a readily detected alternating field within the MR film plane FIG. 5 shows simulated results for the MR signal as function of the offset distance from the MR sensor to gear wheel edge (designated δ in FIG. 3.) The width of gear tooth was assumed to be 6 mm and the sensor to be at a vertical distance of 3 mm from a front tooth. Thick solid curve 51 represents the horizontal magnetic field experienced by the MR sensor as a tooth goes by, while broken curve 52 represents the horizontal magnetic field experienced by the MR sensor as a gap goes by. Thus, as the gear toothed wheel turns, the MR sensor experiences a periodic in-plane (or horizontal) field, and generates an output signal whose polarity changes at the same rate as going from tooth to gap.

An important advantage of the arrangement disclosed above is that there is a high tolerance margin for the offset distance of the MR sensor from the gear wheel edge. Said offset distance can vary by up to 1.5 mm without changing the sensor's output signal by more than 10%. Additionally, the difference in the horizontal field between when a tooth is directly opposite the sensor and when a gap is directly opposite is substantial, easily reaching values of 20 Oe or more.

Another important advantage of the invention is that it lends itself to being manufactured through a wafer-level process (see reference incorporated earlier above)

Figure 6A:
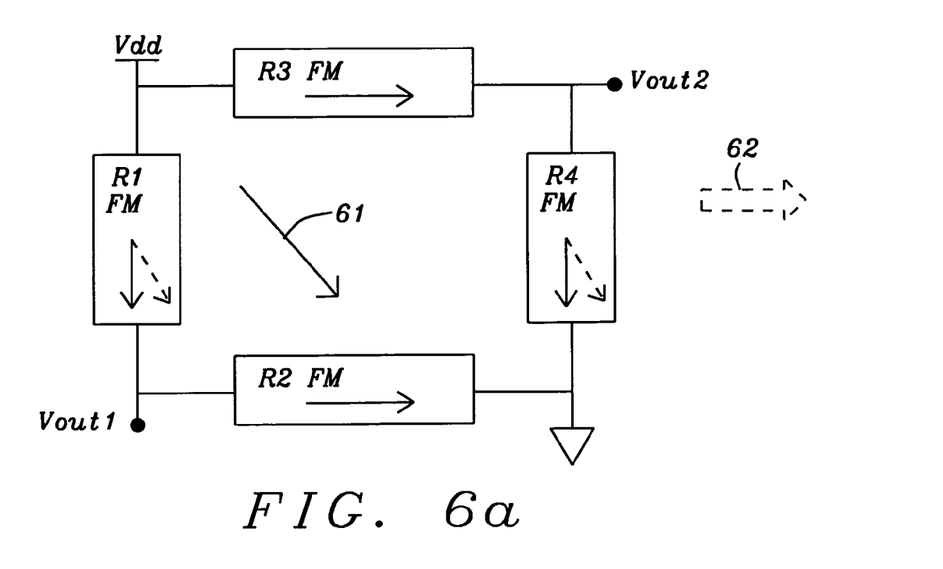
FIGS. 6a-6d. Shows four embodiments of the invention that differ from one another in the direction given to the pinned reference field.

Referring now to FIG. 6a, shown there, as a first embodiment, is a Wheatstone bridge consisting of four identical MR elements (stripes), R1, R2, R3 and R4. To fabricate these four sensing elements, a full MR film is first deposited (including pinned and pinning layers, a transition layer, a free layer, and a capping layer). This is followed by thermal annealing in the presence of a large external field in order to set (pin) the reference magnetization along a specific direction. Photolithography is then used to pattern the MR film into four separate rectangular shapes that all have the same large aspect ratio (typically between 1.5 and 1000) but with different orientations in the plane.

The long axes of R1 and R4 have the same orientation, shown as solid arrows and angled 45 degree away from the direction of (above-mentioned) reference magnetization 61. R2 and R3 are also oriented to have their long axes pointing 45 degree away from magnetic reference pinning direction 61, but in the perpendicular direction to R1 and R4 so that R2 and R3 end up at right angles to R1 and R4. R1 and R2 are series connected to form one branch of Wheatstone bridge, while R3 and R4 are series connected to form the other. The long axes of R2 and R3 are parallel to the axis of the toothed wheel which is also the in-plane field direction of their free layers (as shown earlier in FIG. 4a) while the long axes of R1 and R4 are perpendicular to the axis of the toothed wheel, i.e. perpendicular to the in-plane field direction of their free layers.

A constant voltage is applied between the junction of R1 and R3 and the junction of R2 and R4. Output voltage Vout1 is taken at the junction of R1 and R2) while output voltage Vout2 is taken at the junction of R3 and R4. As the toothed wheel rotates, the influence of gear field 62 on the bridge elements changes. Field 62 has a constant direction, but it alternates in magnitude at the MR bridge' location. The free magnetizations (FM) in MR elements R1 and R4 rotate away from their longitudinal direction as they respond to the field, being shown in the figure as broken lines, while the free magnetizations in MR elements R2 and R3 do not change since the gear field is in the same direction as their initial magnetization direction in the longitudinal direction. The value of Vout1−Vout2 is thus proportional to gear field 62 and so can be amplified and processed to provide a value for the speed of rotation of the toothed wheel.

Figure 6B:
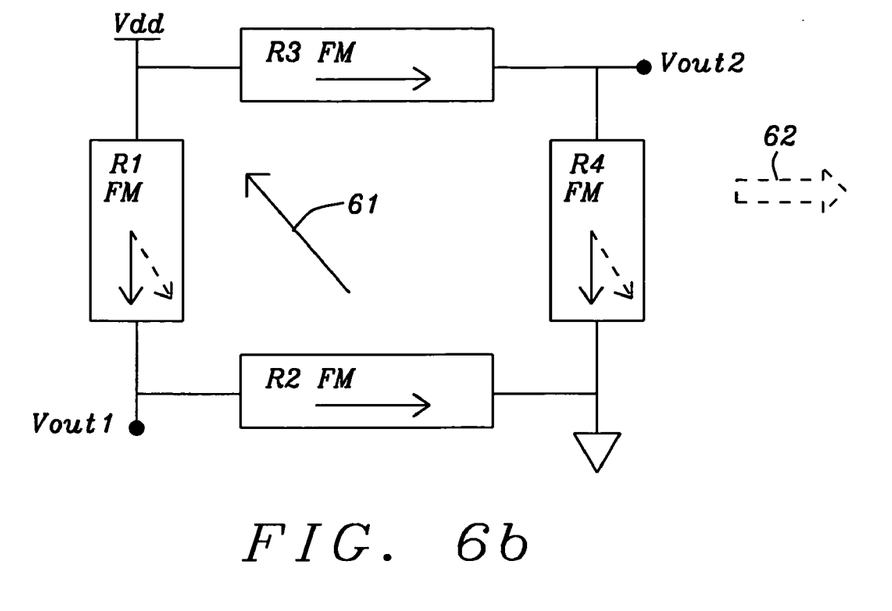
Figure 6C:
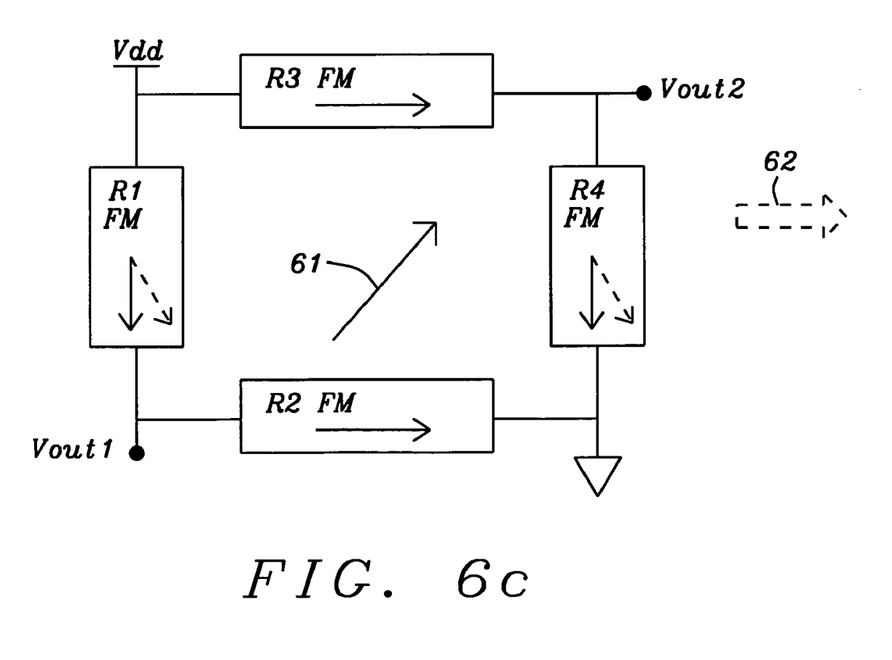
Figure 6D:
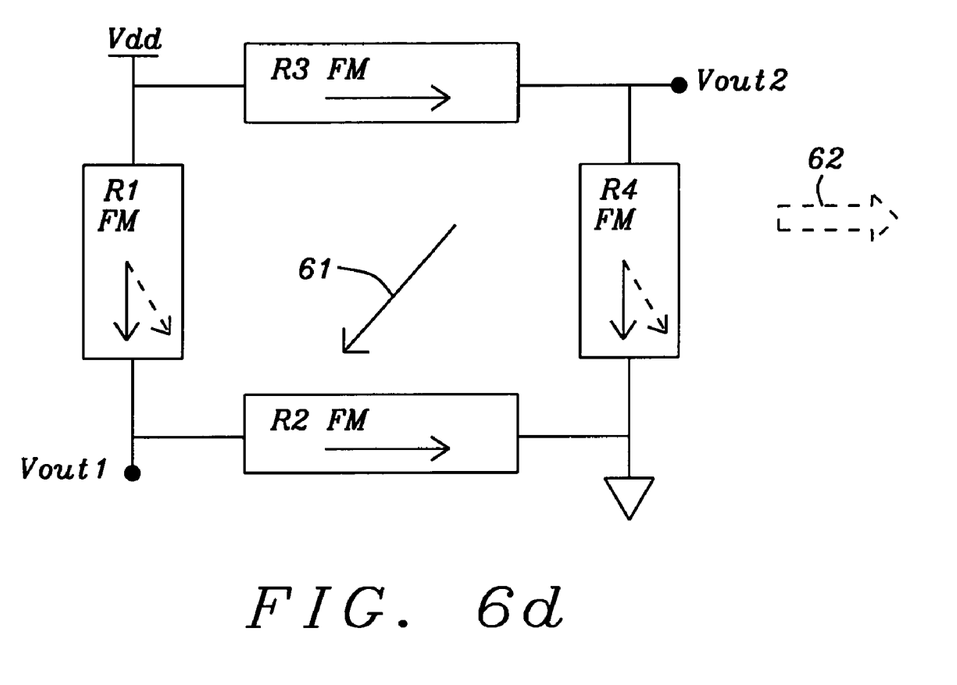

Some additional (though not necessarily all) possible embodiments are shown in FIGS. 6b, c, and d. All follow similar arrangements to that seen in FIG. 6a except that the direction of reference magnetization 61 is different in each case. In FIG. 6b, R1 and R4 have their long axes pointing 135 degree away from magnetic reference direction 61, while R2 and R3 have long axes pointing −135 degree away from magnetic reference direction 61. In FIG. 6c, R1 and R4 have long axes pointing −45 degree away from direction 61, while R2 and R3 have long axes that point 45 degree away from 61. In FIG. 6d, R1 and R4 have long axes pointing −135 degree away from 61, while R2 and R3 have long axes pointing 135 degree away from 61.

The MR elements may be either GMR (Giant Magneto-resistance) or MTJ (Magnetic Tunnel Junction) devices. It should also be noted that, although one of the main principles of operation is that the resistances of the R2 and R3 elements are unaffected by the size of the gear field, they should not be replaced by fixed resistors because, during operation, some heating of the system is inevitable. Since fixed resistors will have different TCRs (temperature coefficients of resistance) from the MR devices, such heating would introduce errors into the bridge's output.

Regardless of which type of MR device is employed, the invented system has a number of additional applications beyond measuring rotation speeds, these include:

(a) The general principles governing the operation of the invention make it capable of application to any structure, which is subject to cyclic motion, for the purpose of determining where in its cycle the structure is.

(b) There is no requirement for rotation to be taking place while the precise positions of teeth and gaps are being sensed.

(c) The position of a tooth in a first gear wheel relative to a second gear wheel, or to a cam, can be precisely determined, whether or not either or both parts are rotating. This type of TPOS (True Power On State) function, allows the first wheel to 'know', at power-up time, whether it is facing a tooth or a gap before the two (gear wheels or wheel and cam) are brought together.

(d) As can be seen in the right hand portion of FIG. 3, the out-of plane field will vary, depending on the value of δ. Although it is a feature of the invention that this variation is normally small, it can, if need be, be made more sensitive by (for example) reducing the aspect ratios of the MR elements.

Such a modification enables the system to detect any wobble that may be occurring as the wheel rotates well before it manifests itself mechanically. If only wobble is to be measured, the wheel need not be toothed as long as it has a ferromagnetic portion extending inwards from the outer edge (rim). If a toothed wheel is used then the same sensor could be used to measure both rotation and wobble simultaneously.

What is claimed is:

1. A method to determine position and rotational speed of a toothed wheel having a single rim, an outer edge, and ferromagnetic teeth, comprising:
    causing said ferromagnetic teeth to revolve around a common point;
    providing a sensor that includes at least one permanent magnet that generates a gear field extending away from said outer edge in a direction parallel to said single rim, said gear field having a maximum value when a ferromagnetic tooth is directly opposite said permanent magnet and a minimum value when a gap between two teeth is directly opposite said permanent magnet;
    providing first, second, third, and fourth magneto-resistive (MR) elements, each having a long axis, a free layer, and a reference layer;
    through a first node, connecting a first end of said first MR element to a first end of said second MR element and orienting said second MR element whereby the long axes of said first and second elements are at right angles to one another;
    through a second node, connecting a first end of said third MR element to a first end of said fourth MR element and orienting said third and fourth MR elements whereby the long axes of said third and fourth elements are parallel to the long axes of said first and second MR elements, respectively;
    through a third node, connecting a second end of said first MR element to a second end of said third MR element and connecting a second end of said second MR element to a second end of said fourth MR element through a fourth node, thereby serially connecting all four of said MR elements to form a closed loop;
    positioning said sensor to overlie said single rim at a first distance therefrom;
    further positioning said sensor so that it is displaced a second distance from an edge of said toothed wheel whereby part of said sensor does not overlie said single rim;
    orienting said sensor so that said free layers are parallel to said single rim and the long axes of said first and fourth MR elements are parallel to said edge;
    for all MR elements, magnetically pinning said reference layers in a single direction that is neither parallel nor normal to that of any of said long axes;
    applying an input voltage across said third and fourth nodes and extracting an output signal from between said first and third nodes, said output signal being proportional to the value of said gear field; and
    thereby, enabling said gear wheel's rotational status to be determined at any time, including when said gear wheel is not rotating.

2. The method of claim 1 wherein said sensor includes at least two permanent magnets arranged so that they generate a field-free area at said MR elements whenever said sensor directly opposes a gap between said gear wheel teeth.

3. The method of claim 1 wherein said MR elements are selected from the group consisting of GMR and MTJ devices.

4. The method of claim 1 wherein said direction in which all reference layers are pinned is about 45 degrees relative to any and all of said MR element long axes.

5. The method of claim 1 wherein an effective value for said distance from said rim is a value in the range of from 0.1 to 10 mm.

6. The method of claim 1 wherein a preferred value for said distance from said single rim is a value in the range of from 1 to 6 mm.

7. The method of claim 1 wherein an effective value for said distance that said sensor is displaced away from said edge is a value in the range of from 0 to 5 mm.

8. The method of claim 1 wherein a preferred value for said distance that said sensor is displaced away from said edge is a value in the range of from 1 to 3 mm.

9. The method of claim 1 wherein said aspect ratio of said MR elements is in the range of from 1.5 to 1000.

10. The method of claim 1 wherein said MR elements all have the same temperature coefficient of resistance.

11. The method of claim 1 further comprising adjusting voltage at said first node to zero prior to determining gear wheel status.

12. An apparatus to determine position and rotational speed of a toothed wheel having a single rim, an outer edge, and ferromagnetic teeth, comprising:
    said ferromagnetic teeth being disposed to revolve around a common point
    a sensor that includes at least one permanent magnet that generates a gear field extending away from said outer edge in a direction parallel to said single rim, said gear field having a maximum value when a ferromagnetic tooth is directly opposite said permanent magnet and a minimum value when a gap between two teeth is directly opposite said permanent magnet;
    first, second, third, and fourth magneto-resistive (MR) elements, each having a long axis, a free layer, and a reference layer;
    a first end of said first MR element being connected to a first end of said second MR element, said second MR element being oriented so that the long axes of said first and second elements are at right angles to one another;
    a first end of said third MR element being connected to a first end of said fourth MR element and said third and fourth MR elements being orienting so that their long axes are parallel to the long axes of said first and second MR elements, respectively;
    a second end of said first MR element being connected to a second end of said third MR element and a second end of said second MR element being connected to a second end of said fourth MR element, all four of said MR elements being thus serially connected in a closed loop;
    said sensor being positioned to overlie said single rim at a first distance therefrom;
    said sensor being displaced a second distance from an edge of said toothed wheel whereby part of said sensor does not overlie said single rim;
    said sensor being oriented so that said free layers are parallel to said single rim and the long axes of said first and fourth MR elements are parallel to said edge; and
    all said reference layers being magnetically pinned in a direction that is the same for all of said MR elements, said direction being neither parallel nor normal to that of any of said long axes.

13. The apparatus described in claim 12 wherein said sensor includes at least two permanent magnets arranged so that they generate a field-free area at said MR elements whenever said sensor directly opposes a gap between said gear wheel teeth.

14. The apparatus described in claim 12 wherein said MR elements are selected from the group consisting of GMR and MTJ devices.

15. The apparatus described in claim 12 wherein said direction in which all reference layers are pinned is about 45 degrees relative to any and all of said MR element long axes.

16. The apparatus described in claim 12 wherein an effective value for said distance from said single rim is a value in the range of from 0.1 to 10 mm.

17. The apparatus described in claim 12 wherein a preferred value for said distance from said single rim is a value in the range of from 1 to 6 mm.

18. The apparatus described in claim 12 wherein an effective value for said distance that said sensor is displaced away from said edge is a value in the range of from 0 to 5 mm.

19. The apparatus described in claim 12 wherein a preferred value for said distance that said sensor is displaced away from said edge is a value in the range of from 1 to 3 mm.

20. The apparatus described in claim 12 wherein said aspect ratio of said MR elements is in the range of from 1.5 to 1000.

21. The apparatus described in claim 12 wherein said MR elements all have the same temperature coefficient of resistance.

22. A method to measure an amount of wobble of a rotating wheel having a single rim and a ferromagnetic portion that extends inwards for a first distance from a single continuous outer edge, comprising:

providing a magneto-resistive (MR) sensor and at least one permanent magnet to generates a bias field that extends away from said outer edge in a direction parallel to said single rim;

positioning said sensor to overlie said single rim at a distance therefrom;

further positioning said sensor so that its center is displaced a second distance from said outer edge whereby, as said wheel rotates, said second distance will vary in a cyclic manner that depends on how much wobble is exhibited by said wheel; and thereby measuring said amount of wobble by observing changes in said sensor's output as said wheel revolves about a single point.

23. The method of claim 22 wherein said sensor is a bridge comprising MR elements selected from the group consisting of GMR and MTJ devices.

24. The method of claim 23 wherein each of said MR elements has an aspect ratio in a range of 1.5 to 300 whereby it is optimized for measuring wobble.

25. The method of claim 23 wherein each of said MR elements has an aspect ratio in a range of 3 to 50 whereby it is optimized for simultaneously measuring both rotation and wobble.

26. The method of claim 22 wherein an effective value for said second distance is a value in a range of 0 to 3 mm.

27. The method of claim 22 wherein a preferred value for said second distance is a value in a range of 0 to 1.5 mm.

28. The method of claim 22 wherein said wheel is a toothed wheel and said sensor is optimized for measuring both rotation and wobble.

29. The method of claim 22 wherein said wheel is a toothed wheel and two sensors are provided, one of which is optimized for measuring rotation and one of which is optimized for measuring wobble.

* * * * *